United States Patent [19]
Delimoy et al.

[11] Patent Number: 5,643,382
[45] Date of Patent: Jul. 1, 1997

[54] PROCESS AND DEVICE FOR MANUFACTURING A REINFORCED COMPOSITE ARTICLE

[75] Inventors: Didier Delimoy, Dion-Valmont; Thierry De Bruille, Rixensart, both of Belgium

[73] Assignee: Solvay, Brussels, Belgium

[21] Appl. No.: 528,214

[22] Filed: Sep. 13, 1995

[30] Foreign Application Priority Data

Sep. 15, 1994 [BE] Belgium ............................. 09400830
Dec. 23, 1994 [BE] Belgium ............................. 09401158

[51] Int. Cl.$^6$ ............................................. B65H 81/00
[52] U.S. Cl. ..................... 156/172; 156/169; 156/425; 156/429; 156/430; 156/446; 156/309.6; 156/309.9
[58] Field of Search ..................... 156/169, 172, 156/173, 175, 425, 181, 430, 429, 446, 309.6, 309.9, 308.2

[56] References Cited

U.S. PATENT DOCUMENTS

| | | | |
|---|---|---|---|
| 2,467,999 | 4/1949 | Stephens | 156/173 X |
| 3,470,057 | 9/1969 | Stuart, Jr. et al. | |
| 3,556,888 | 1/1971 | Goldsworthy | 156/181 X |
| 3,715,252 | 2/1973 | Fairbairn | 156/162 |
| 4,010,054 | 3/1977 | Bradt | 156/173 |
| 4,514,245 | 4/1985 | Chabrier | 156/172 X |
| 4,938,823 | 7/1990 | Balazek et al. | 156/166 |
| 4,938,824 | 7/1990 | Youngkeit | 156/173 |
| 4,990,213 | 2/1991 | Brown et al. | 156/425 |
| 5,122,211 | 6/1992 | Roach | |
| 5,447,586 | 9/1995 | Tam | 156/173 X |
| 5,492,583 | 2/1996 | Fingerson et al. | 156/180 |

FOREIGN PATENT DOCUMENTS

| | | |
|---|---|---|
| 0463611 | 1/1992 | European Pat. Off. |
| 2112918 | 6/1972 | France |
| 2645070 | 10/1990 | France |
| 2818376 | 11/1978 | Germany |

OTHER PUBLICATIONS

Enders, Mark, "Developments in Thermoplastic Filament Winding," 22nd International SAMPE Technical Conference, Nov. 6–8, 1990, pp. 88–97.

Youngs, Andy, "Advanced Composite Thermoplastics: A New Structural Material," Society of Plastics Engineers, 43rd Annual Technical Conference Proceedings, Apr. 20–May 2, 1985, pp. 1181–1183.

Kunstoffberater, vol. 39, No. 4, Apr. 1994 Isernhagen DE, pp. 46–49, XP 000435529, R. Funck et al, Fertigungsbedingte Eigenspannungen in Gewickelten Bauteilen.

Abstract of FR 2645–070–A, Hembert, Apr. 4, 1989.
Abstract of FR 2112918–Q, Oharu, Nov. 5, 1970.
Abstract of DT 2818–376, Courtaulds, Apr. 27, 1977.

*Primary Examiner*—Jeff H. Aftergut
*Attorney, Agent, or Firm*—Spencer & Frank

[57] ABSTRACT

Process for manufacturing a composite article comprising a solid body reinforced by winding at least one reinforcing tape around the solid body. The reinforcing tape deposited on the solid body is subjected to a constant tensile force. Downstream of the point where it comes into contact with the solid body, this reinforcing tape is consolidated by a local pressure. The invention also relates to a device for the manufacture of such reinforced composite articles.

22 Claims, 4 Drawing Sheets

PROCESS AND DEVICE FOR MANUFACTURING A REINFORCED COMPOSITE ARTICLE

BACKGROUND OF THE INVENTION

The subject of the present invention is a process and a device for manufacturing a reinforced composite article.

In many industrial fields, composite articles are used consisting of a solid plastic-based body reinforced by means of reinforcing fibres such as glass fibres. These reinforcing fibres may especially be employed in the form of bundles of continuous fibres, these bundles being impregnated with a thermoplastic. It is thus possible to manufacture, for example, bars, rods, longerons, beams, sections, etc., reinforced by bundles of continuous fibres, these bundles being wound at their surface and these articles having a low weight and a high mechanical strength.

Currently, these plastic-based reinforced composite articles are manufactured by firstly extruding a plastic solid body. This solid body is then sized and then possibly reheated in order to soften its outer surface layer. One or more reinforcing tapes, generally comprising reinforcing fibres, for example glass fibres impregnated with a thermoplastic, are then wound round the solid body. This winding is performed, for example, by means of a device for winding the reinforcing tapes rotating around the solid body while the latter runs axially through this winding device. The speed of rotation of this device is regulated as a function of the running speed of the solid body so as to determine the pitch of the winding.

A first process for ensuring sufficient contact pressure of the reinforcing tape or tapes on the solid body consists, when winding the reinforcing tape, in exerting a large tensile force on this tape. This tensile force must especially create a suitable pressure between the reinforcing tape and the solid body. Control equipment can adjust the tensile force exerted on the reinforcing tape, but the effective contact pressure, however, is not easily quantifiable since it depends not only on the tensile force exerted on the reinforcing tape, but also on the contact conditions, especially on the deformations of the surface layer of the solid body and/or of the reinforcing tape due to the effect of the tensile force. If the tensile force required for ensuring good adhesion of the wound reinforcing tape is too great, it generates large deformations of the reinforcing tape, for example a regrouping of the fibres lying within the reinforcing tape towards the centre of the latter and creep of the plastic impregnating it towards its periphery. In extreme cases, the article may be deformed and/or the reinforcing tape may penetrate deeply into the solid body. In addition, the surface finish of the articles obtained by this process is often poor, therefore making it especially difficult to deposit the optional finishing layer.

Another process for ensuring sufficient contact pressure between the reinforcing tape and the solid body consists in applying a local pressure on the reinforcing tape in the region of the area of first contact between the reinforcing tape and the solid body. For this purpose, a cooled compression block is arranged at the very point of the first contact between the reinforcing tape and the solid body. The contact pressure, which is thus largely independent of the tensile force exerted on the reinforcing tape, becomes more easily controllable. It is consequently applied more uniformly and the surface finish of the article is improved. However, the compression block must be maintained at a sufficiently low temperature to prevent the plastic from adhering to it. In this process, it is therefore very important to maintain the temperature of the contact surface of the block below a critical value. This critical temperature depends, among other things, on the nature of the plastic constituting, covering or impregnating the reinforcing tape. In general, it is below room temperature. The result of this is that the reinforcing tape, which moreover has a very low thermal inertia, is immediately on contact with the pressure block. It is consequently impossible to have an optimum temperature of the reinforcing tape—that is to say an optimum viscosity of the plastic which impregnates it—at the point where it is applied to the softened surface of the solid body. In conclusion, this process does not really enable conditions to be obtained which favour good adhesion between the reinforcing tape and the solid body.

SUMMARY OF THE INVENTION

The object of the present invention is therefore to provide a process and a device for manufacturing plastic-based reinforced articles which allow better control of the conditions for applying one or more reinforcing tapes to a solid body.

This object is achieved by a process for manufacturing a composite article comprising a reinforced solid body, according to which process at least one reinforcing tape is wound around the solid body of the article, based on a plastic A, which is characterized in that a consolidation pressure is exerted locally and exclusively on the reinforcing tape at one or more places located downstream of the point where it comes into contact with the solid body.

In the detailed description of the invention which follows, for convenience only a single reinforcing tape will be referred to although, as explained hereinabove, the invention relates in an equivalent manner to variants in which several reinforcing tapes are wound around the solid body, the tapes being able to be arranged so as to form one or more layers.

Solid body is understood to mean any type of solid component manufactured by injection, by extrusion or by any other process. By way of example of a solid body, mention may be made of bars, sections, etc.

The winding around the solid body may be carried out in any known manner. Often the winding is helical.

Using the process according to the invention, it is possible to optimize, independently of each other, the initial contact pressure of the reinforcing tape on the solid body and the consolidation pressure of this tape already in contact with the solid body. The initial contact pressure is determined by the tensile force exerted on the reinforcing tape when winding it. This tensile force may be moderated, so as to obtain a precise positioning of the reinforcing tape, so as not to adversely affect its structure and so as to prevent any deformation of the solid body. In fact, in the process according to the invention, this tensile force is not absolutely essential for the purpose of ensuring good adhesion of the reinforcing tape to the solid body.

In the area of first contact between the surface of the solid body and the reinforcing tape, the temperatures may be maintained at ideal values, at which the plastic comprising the surface of the solid body, and if required, that constituting, coating or impregnating the reinforcing tape, are in the viscous or softened state, in which state they have a sufficiently low viscosity to ensure optimum adhesion. These ideal conditions are not in fact disturbed either by cooling or by excessive contact pressure in the area of application. In particular, it is preferred that the surface of the solid body be heated so that it is softened at the point where the reinforcing tape comes into contact with the solid body. Between the point where the reinforcing tape comes into contact with the softened surface of the solid body and the point where the consolidation pressure is applied, it is consequently possible to maintain pressure and temperature conditions which are optimum for ensuring excellent application of the reinforcing tape to the thus softened surface layer of the solid body.

In order to enhance the adhesion between the reinforcing tape and the solid body, it is also possible to use a reinforcing tape or a solid body of which at least one face is coated with an adhesive material. Alternatively and advantageously, it is also possible to use a reinforcing tape consisting of, coated or impregnated with a thermoplastic which is heated before being applied to the solid body. In this case, it is preferred that, at the point of consolidation, the thermoplastic which constitutes, coats or impregnates the reinforcing tape be at a temperature of between $T_f+10°$ C. and $T_f+100°$ C. in the case of semicrystalline polymers ($T_f$ denoting their melting temperature) or at a temperature of between $T_v+20°$ C. and $T_v+150°$ C. in the case of amorphous polymers ($T_v$ denoting their glass transition temperature). The surface layer may also be formed by a reinforcing tape deposited beforehand on the solid body. The consolidation by local pressure then guarantees that the various layers of reinforcing tapes are compacted and that the external appearance of the article is improved. Air inclusions between the solid body and the layer or layers of reinforcing tapes are especially eliminated.

The consolidation by radial compression of the reinforcing tape and of the surface layer of the solid body is performed downstream of the point where the reinforcing tape is deposited on the solid body. It follows that, at the point where this compression takes place, the reinforcing tape has already been completely applied to the surface layer of the solid body and that the subsequent consolidation can no longer have any adverse effects on the accuracy of application or on the internal structure of the reinforcing tape. The consolidation pressure may especially be increased without thereby affecting the initial contact pressure, which is determined exclusively by the tensile force exerted on the reinforcing tape.

When the winding is helical, the axial distance separating the point where the reinforcing tape is deposited on the solid body from that where the consolidation pressure is exerted is preferably at least equal to the pitch of the winding. Particularly preferably, it is of the order of magnitude of the average transverse dimensions of the solid body.

According to a preferred embodiment, the reinforcing tape is subjected to a constant tensile force while it is being wound onto the solid body. This thus prevents either too great a tensile force or too low a tensile force being exerted on the reinforcing tape. Too high a tension may in fact generate deformations of the reinforcing tape and/or of the solid body, producing the adverse effects mentioned earlier. Too low a tension does not cause the reinforcing tape to be applied optimally to the solid body.

It will be noted that the reinforcing tape is advantageously cooled at the point where it is subjected to the local consolidation pressure, so as especially to obtain a better appearance of the outer surface of the article.

Preferably, the reinforcing tape comprises at least one bundle of reinforcing fibres impregnated with a plastic B.

Advantageously, so as to obtain a more uniform outer surface, a finishing layer based on a plastic C is applied to the solid body coated with the reinforcing tape, downstream of the point where the local consolidation pressure is exerted. In this way, it is possible to produce either articles with a perfectly smooth surface or articles comprising a surface having a well-defined texture. The addition of an external layer based on a plastic C may be performed, for example, by an extrusion-coating process. Often the thickness of such a finishing layer is small.

Other layers may also be applied around the solid body before the finishing layer, for example an impermeabilization layer consisting of a thin metal foil wound around the solid body coated with the reinforcing tape.

According to another embodiment, the local consolidation pressure is exerted on the tape at several points spaced angularly around the solid body. The consolidation is thus distributed over several different points and the radial consolidation pressure exerted at each of the points in question may be smaller.

The present invention also provides a device for the manufacture of a composite article comprising a reinforced solid body, comprising at least one device for winding at least one reinforcing tape around the solid body of the article, based on a plastic A, as well as at least one consolidation device locally exerting a pressure on the reinforcing tape, which is characterized in that the consolidation device is arranged so as to exert the pressure downstream of the point where the reinforcing tape comes into contact with the solid body.

In a first preferred embodiment, the consolidation device comprises at least one compression member and means of movement enabling the latter to move from a position away from the solid body to a position in which it exerts a predetermined local pressure on the reinforcing tape in contact with the solid body.

Preferably, the compression member comprises a circuit for cooling its contact surface intended to be pressed against the reinforcing tape. Thus the plastic is prevented from adhering to the consolidation device.

Advantageously, the compression member comprises an idler roller. This idler roller is moved against the reinforcing tape applied to the solid body, rotating around its longitudinal axis. Alternatively, the compression member may comprise a block.

According to another embodiment, the consolidation device is driven by means imposing on it a relative rotation with respect to the solid body.

Alternatively, several consolidation devices are arranged around the solid body so as to exert a consolidation pressure at regularly spaced points. In this case, the consolidation devices are advantageously driven by means imposing on them a rotary reciprocating movement having an angular amplitude at least equal to 360°/n, n denoting the number of consolidation devices. Preferably, this angular amplitude is at least equal to 360°/n+20°. It is preferred that the various consolidation devices be contained in one and the same plane perpendicular to the axis of the solid body.

According to a convenient embodiment variant, the consolidation devices are supported by a rotary platform driven by a motor via a connecting rod/crankshaft mechanism so as to impart the rotary reciprocating movement to them.

The plastics A, B and C mentioned hereinabove may essentially consist of one or more polymers of any type. Advantageously, they are thermoplastics.

Thermoplastics are understood to mean, for example, polyolefins, especially polyethylene and polypropylene; vinyl chloride polymers, such as PVC; vinylidene fluoride polymers, such as poly(vinylidene fluoride) and copolymers of vinylidene fluoride and chlorotrifluoroethylene, etc.; or alternatively any blend of such thermoplastic polymers.

One or more conventional additives may be added to these plastics, such as pigments, antioxidants, processing aids, fillers, etc.

The reinforcing tape may advantageously comprise one or more bundles of reinforcing fibres, such as carbon, glass or aramid fibres. It is preferred to use glass fibres. These fibres generally have a diameter of 7 to 100 µm and a long length, for example of the order of several hundreds of metres.

In order to reinforce a plastic-based solid body, the reinforcing tape may advantageously be in the form of a COFIT, that is to say in the form of a bundle of COntinuous Fibers Impregnated by a Thermoplastic, in the form of co-mingled fibres, that is to say in the form of a bundle of reinforcing fibres and of mixed thermoplastic fibres, or else in the form of a bundle of fibres between which a powdered thermoplastic has been dispersed. It is obvious that when using such a reinforcing tape it must be heated before its use so that the fibres are correctly impregnated with the thermoplastic B.

In order especially to ensure good adhesion between the solid body and the reinforcing tape, and therefore good uptake of the hoop stresses by the latter, the plastic B used for impregnating the reinforcing tape is preferably compatible with the plastic A or has a similar chemical nature. By way of pairs of plastics of similar chemical nature, it is possible, for example, to use two ethylene polymers or two vinyl chloride polymers. Their compatibility is thus ensured. These two plastics may also be made compatible by the use of one or more suitable compatibilizers mixed with at least one of them.

When a finishing layer is present, good adhesion is desirable between it and the "layer" formed by the reinforcing tape or bands at the surface of the solid body so as to avoid any risk of the finishing layer delaminating. Furthermore, the finishing layer may thus contribute, even if slightly, to taking up the stresses. In order to improve this adhesion, the plastic C is advantageously compatible with the plastic B or of a similar chemical nature. These two plastics may also be rendered compatible by the use of one or more compatibilizers mixed with at least one of them. A layer of adhesive may also be interposed between them.

With the purpose of obtaining high-performance and uniform mechanical properties in the reinforced article and to facilitate possible subsequent recycling of it, the plastics employed are preferably compatible or of a similar chemical nature.

It is therefore more particularly preferred that the plastics employed should essentially consist of high-density polyethylene.

BRIEF DESCRIPTION OF THE DRAWINGS

Other advantages and features of the invention will emerge in a non-limiting way from the detailed description of the embodiments described, by way of example, on the basis of the appended figures in which.

DETAILED DESCRIPTION OF THE INVENTION

Figure 1:
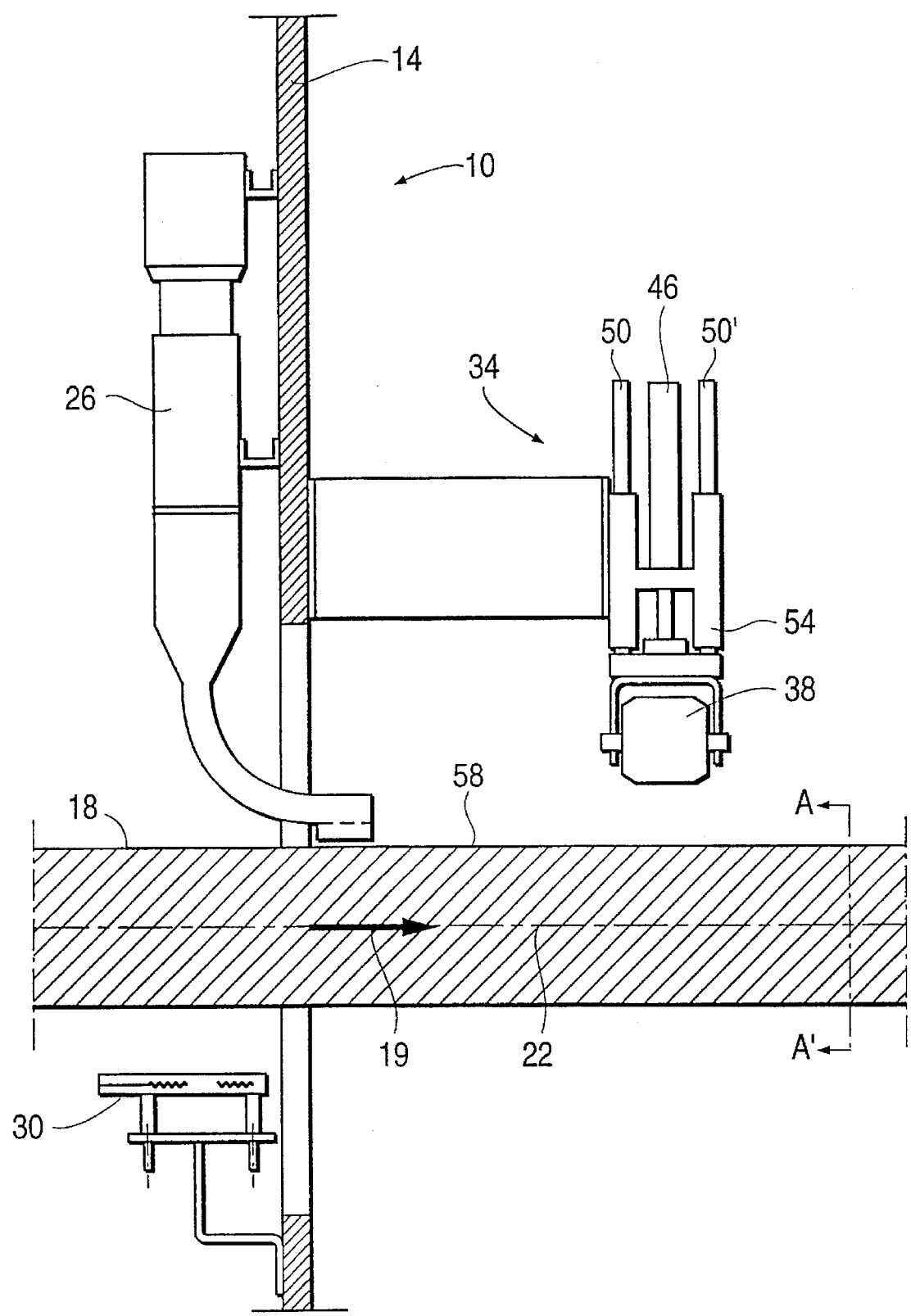
FIG. 1 represents a longitudinal section of a device for manufacturing reinforced composite articles according to the invention.

In FIG. 1 the reference 10 identifies overall a device used for the manufacture of reinforced composite articles, enabling a reinforcing tape to be wound helically around a solid body 18. This device 10 comprises a rotary annular platform 14 rotating around solid body 18. The latter moves along its longitudinal axis 22 through the central orifice in the rotary platform 14, in the direction and sense indicated by the arrow 19. The rotary platform 14 supports four devices for winding and preheating the reinforcing tape to be wound around the solid body 18. However, these winding devices are not shown in this FIG. 1 so as not to clutter it. It will be noted that the conjunction of the rotational movement of the platform 14 and of the translational movement of the solid body 18 produces a helical winding of the reinforcing tape around the solid body 18.

The rotary platform 14 also supports a device (hot-air gun 26) for preheating the solid body 18 using hot air, as well as a device 30 for preheating using infrared radiation. Depending on the application and the polymers used, it is preferred to use either the hot-air gun 26 or the device 30 for heating using infrared radiation, or else both devices 26 and 30 together, in order to soften the surface layer of the solid body 18.

The platform 14 also supports four devices for consolidating the reinforcing tape wound around the solid body; however, only one of them, identified overall by the reference 34, has been shown, for reasons of clarity. In FIG. 1, this consolidation device is more precisely shown in a rest position, away from the solid body 18. The consolidation device 34 comprises, as compression member, an idler roller 38, including an internal cooling circuit connected to an external refrigerating unit (not shown). A pneumatic cylinder 46 enables this idler roller 38 to be moved from its rest position towards the solid body 18 and to be applied radially against the latter. The local consolidation pressure, exerted by the idler roller on the reinforcing tape wound around the solid body 18, may be adjusted by regulating the supply pressure of the cylinder 46. Two guide rods 50, 50', fastened to the idler roller 38, are guided in slide channels 54 fixed rigidly to the platform 14. As a result, the consolidation device 34 is rotationally driven by the platform 14; that is to say it is in relative rotation with respect to the solid body 18.

It should be noted that the reinforcing tape is applied at a point, identified in FIG. 1 by the arrow 58, which is located downstream of the heating devices 26 and 30 and upstream of the consolidation device 34 (the direction of movement of the solid body 18 is indicated by the arrow 19). In other words, the consolidation device 34 enables a radial consolidation pressure to be exclusively applied to the reinforcing tape wound around the solid body at a certain axial distance downstream from the point of application 58 of this reinforcing tape. This distance is optimized so that the reinforcing tape is completely applied to the surface of the solid body 18 before consolidation, and is therefore not disturbed by the latter.

Figure 2:
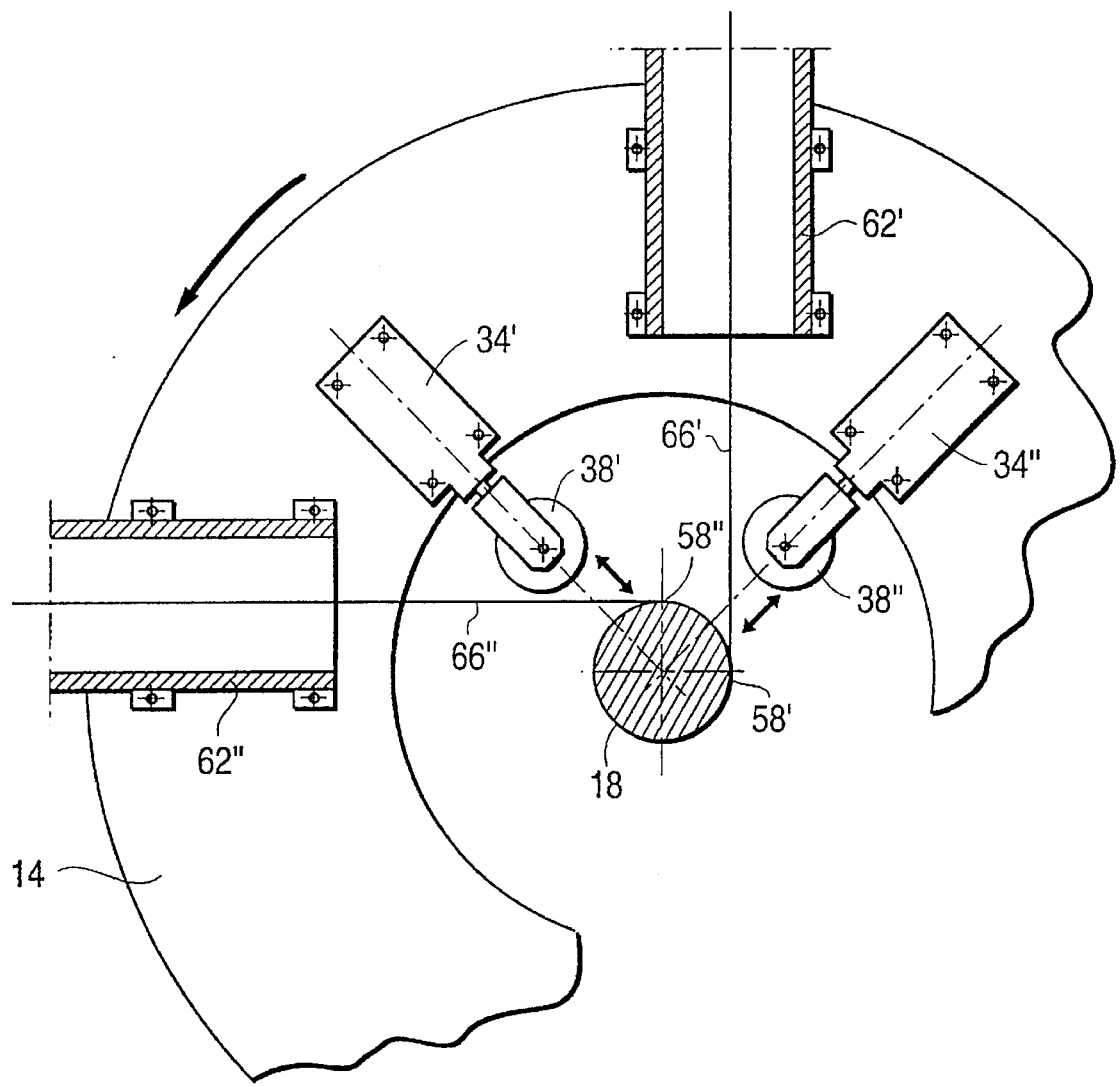
FIG. 2 represents a cross-section through this device along AA'.

FIG. 2 shows a section through the device of FIG. 1 at the consolidation device 34, along the axis AA'. In this figure, the output channels 62', 62" of two of the four winding devices may be seen. Reinforcing tapes 66'and 66" to be wound helically around the solid body 18 leave these output channels 62', 62". Quite obviously, it is conceivable to add additional winding devices to the platform 14, if it is desired to deposit more than four reinforcing tapes on the solid body 18. In FIG. 2, 58'and 58" mark the points where the two reinforcing tapes 66'and 66" are deposited on the solid body 18. Associated with each output channel 62', 62" of the reinforcing tape is a consolidation device, respectively 34' and 34". These consolidation devices are arranged downstream of the winding devices, that is to say they are further from the platform 14 than the latter.

Figure 3:
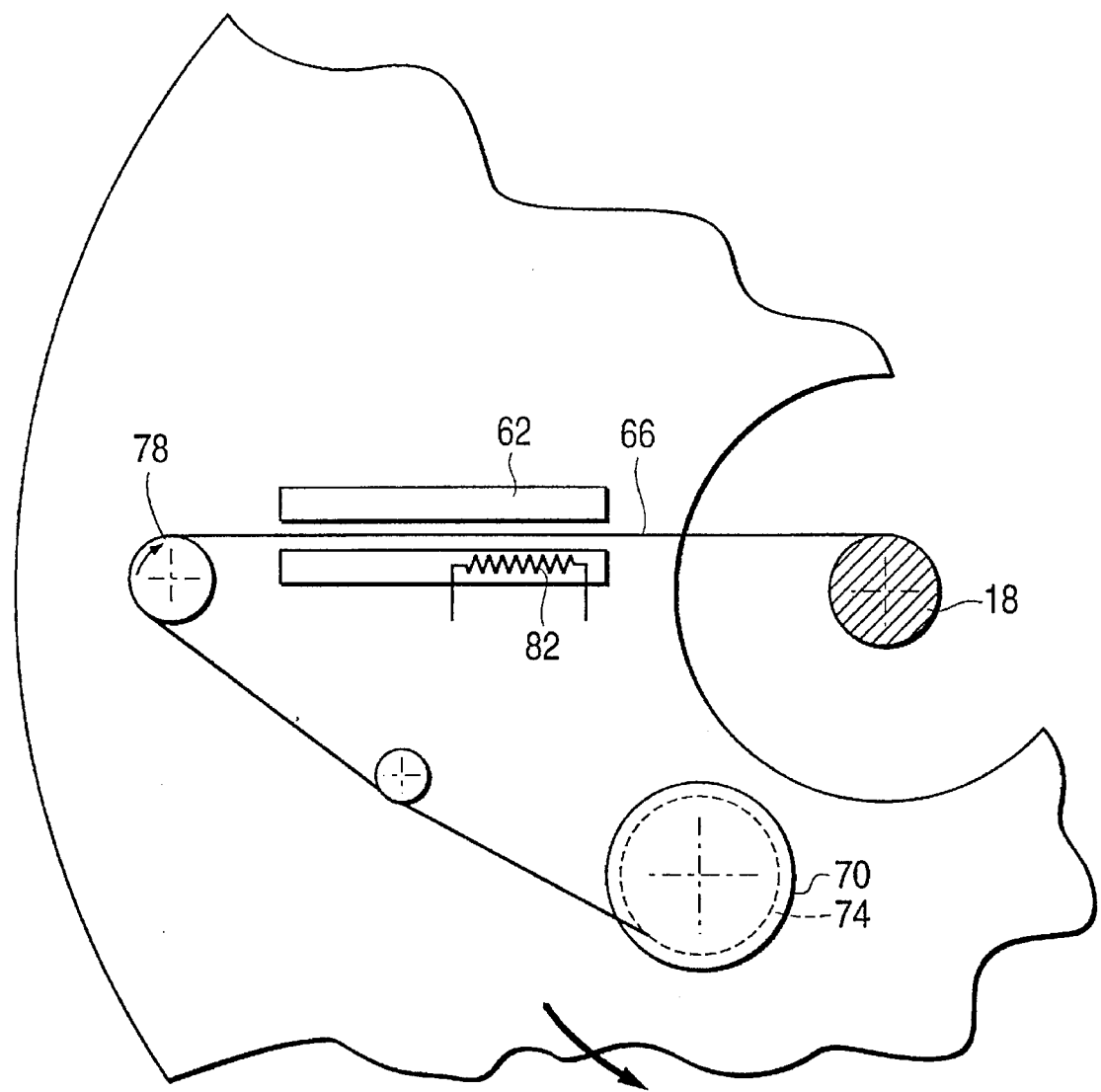
FIG. 3 represents diagrammatically a device for winding the reinforcing tape.

FIG. 3 illustrates in more detail a device for winding a reinforcing tape. The latter is wound on a reel 70 which is mounted on a support roll 74. This roll 74 is equipped with a brake, for example of the powder-based magnetic type, which is capable of producing a regulable braking torque. The tensile force exerted on the reinforcing tape 66 being wound on the solid body 18 is directly proportional to this braking torque. This tensile force is measured continuously by a dynamometer associated with a measurement stage 78. The measured value of this force is continuously compared with a set value. Should the measured value differ from this set value, whether being above or below it, the action of the brake on the roll 74 is consequently adjusted so as to keep the tension in the reinforcing tape virtually constant and equal to a predetermined value. From the measurement stage 78, the reinforcing tape 66 passes through the output channel 62 in which it is preheated by exposing it to an infrared-radiation device 82 which heats the reinforcing tape up to a predetermined temperature before it is deposited on the solid body 18.

Figure 4:
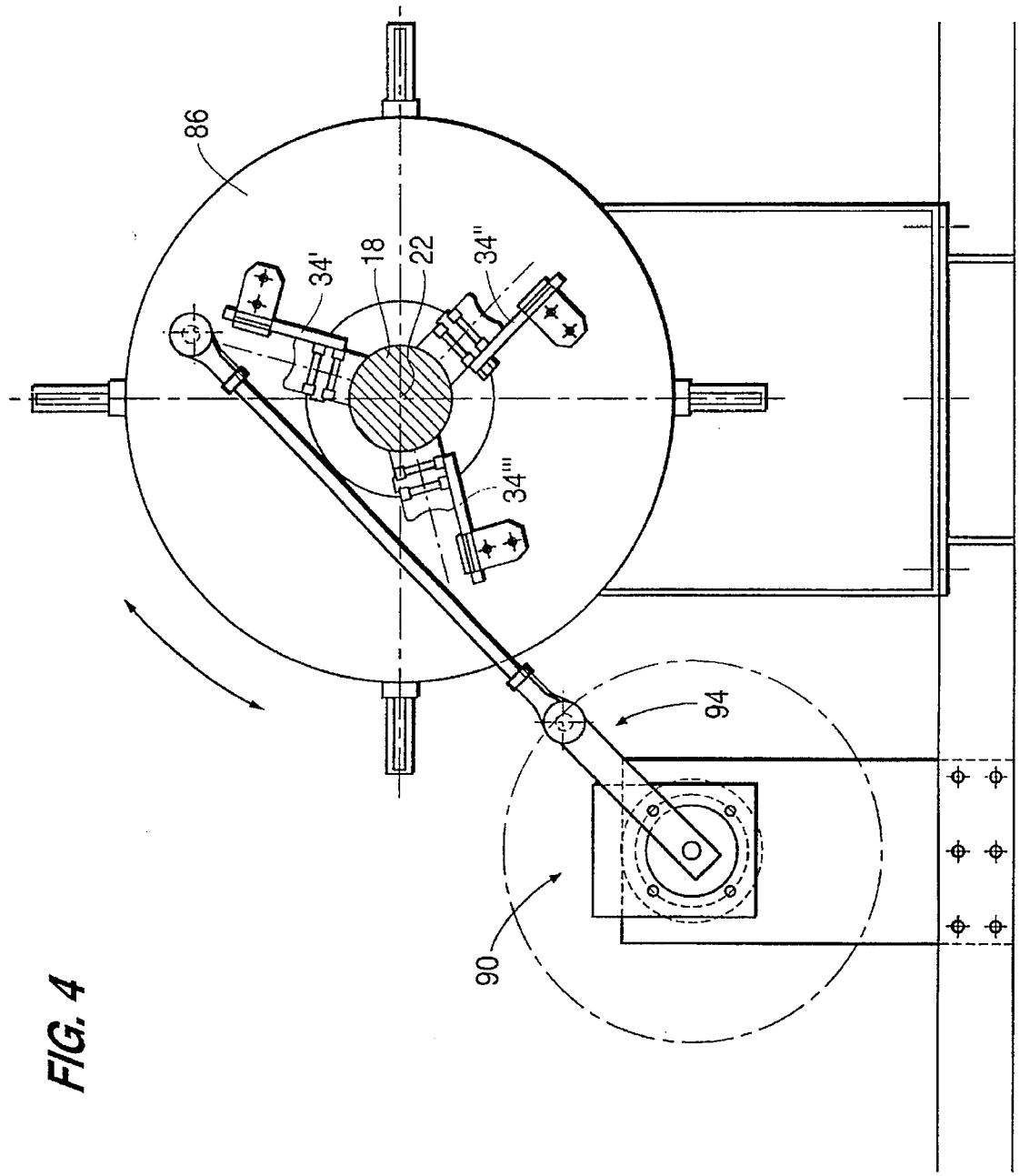
FIG. 4 is a cross-section through an embodiment variant of the device according to the invention.

FIG. 4 shows an embodiment variant of a consolidation device. Three consolidation devices 34', 34" and 34'", of the type described above, are supported by a platform 86 and spaced angularly apart by 120°. This platform 86 rotates independently of the first platform 14 described above, which is no longer shown in this FIG. 4. It is located axially downstream of the point where the reinforcing tape is deposited on the solid body 18. A motor 90, with which a connecting rod/crankshaft mechanism 94 is associated, drives this platform 86 in an oscillatory movement about the axis 22 of the solid body 18. The consolidation members 34', 34", 34'" consequently describe an oscillatory or rotary reciprocating movement (that is to say alternately in a clockwise direction and then in an anticlockwise direction) about the axis 22 of the solid body 18. The amplitude of this oscillatory movement is approximately 150°. It will be noted that the fact of having three separate consolidation devices enables the radial pressure exerted by each of them to be reduced. The consolidation is therefore performed more uniformly. The low amplitude of the oscillatory movement moreover enables the consolidation rollers (38' 38") to be more easily supplied with a coolant, via simple hoses and without using rotating seals besides at the spindle of these rollers. These cooled rollers are therefore hollow rollers equipped with rotating couplings for the supply hoses at their spindles.

We claim:

1. A process for manufacturing a composite article comprising a solid body composed of a plastic A, said process comprising the steps of:

winding at least one reinforcing tape around the solid body A;

exerting a consolidation pressure locally on the reinforcing tape at at least one position located downstream of the point where the reinforcing tape comes into contact with the solid body; and separating the point where the reinforcing tape comes into contact with the solid body from the at least one position in which the consolidation pressure is exerted by an axial distance that is at least equal to a pitch of the wound reinforcing tape, whereby an initial contact pressure occurring between the reinforcing tape and the solid body is determined exclusively by a tensile force exerted on the reinforcing tape.

2. The manufacturing process according to claim 1, wherein said exerting step includes exerting the local consolidation pressure on the tape at several points spaced angularly around the solid body.

3. The manufacturing process according to claim 2, wherein said at least one consolidation device comprises a plurality of consolidation devices arranged around the solid body; further comprising drive means for driving said consolidation devices with a rotary reciprocating movement having an angular amplitude of at least 360°/n, wherein n denotes a number of said consolidation devices.

4. The manufacturing process according to claim 3, further comprising a rotary platform supporting said consolidation devices; and wherein said drive means comprises a motor connected to said rotary platform via a connecting rod/crankshaft mechanism for driving said rotary platform.

5. The manufacturing process according to claim 1, further comprising the step of heating the surface of the solid body so that it is softened at the point where the reinforcing tape comes into contact with the solid body.

6. The manufacturing process according to claim 1, further comprising the step of subjecting the reinforcing tape to a constant tensile force while it is being wound onto the solid body.

7. The manufacturing process according to claim 1, further comprising the step of cooling the reinforcing tape at the point where it is subjected to the local consolidation pressure.

8. The manufacturing process according to claim 1, wherein the reinforcing tape comprises at least one bundle of reinforcing fibers impregnated with a plastic B.

9. The manufacturing process according to claim 1, further comprising the step of applying a finishing layer based on a plastic C to the solid body coated with the reinforcing tape, downstream of the point where the local consolidation pressure is exerted.

10. The manufacturing process according to claim 1, wherein the axial distance of said separating step is about equal to an average transverse dimension of the solid body.

11. A process for manufacturing a composite article comprising a solid body composed of a plastic A, said process comprising the steps of:

winding at least one reinforcing tape around the solid body;

exerting a consolidation pressure locally on the reinforcing tape exclusively at at least one position located downstream of the point where the reinforcing tape comes into contact with the solid body; and separating the point where the reinforcing tape comes into contact with the solid body from the at least one position in which the consolidation pressure is exerted by an axial distance that is at least equal to a pitch of the wound reinforcing tape.

12. A device for the manufacture of a composite article comprising a solid body composed of a plastic A, said device comprising:

at least one device adapted for winding at least one reinforcing tape around the solid body;

at least one consolidation device adapted to locally exert a pressure on the reinforcing tape, said consolidation device being arranged so as to exert the pressure at a location downstream of, and separated by an axial distance that is at least equal to a pitch of the wound reinforcing tape from a point where the reinforcing tape comes into contact with the solid body, whereby an initial contact pressure occurring between the reinforcing tape and the solid body is determined exclusively by a tensile force exerted on the reinforcing tape.

13. The manufacturing device according to claim 12, wherein a plurality of consolidation devices are arranged around the solid body.

14. The manufacturing device according to claim 13, wherein the consolidation devices are driven by means imposing on them a rotary reciprocating movement having an angular amplitude at least equal to 360°/n, wherein n denotes the number of consolidation devices.

15. The manufacturing device according to claim 14, further comprising a rotary platform supporting the consolidation devices, said rotary platform being driven by a motor via a connecting rod/crankshaft mechanism.

16. The manufacturing device according to claim 12, wherein said consolidation device comprises at least one compression member and means of movement for moving said compression member from a position away from the solid body to a position in which said compression member exerts a predetermined local pressure on the reinforcing tape in contact with the solid body.

17. The manufacturing device according to claim 16, wherein the compression member comprises a circuit for cooling its contact surface intended to be pressed against the reinforcing tape.

18. The manufacturing device according to claim 16, wherein the compression member comprises an idler roller.

19. The manufacturing device according to claim 16, wherein the compression member comprises a block.

20. The manufacturing device according to claim 12, wherein the consolidation device is driven by means imposing on said consolidation device a relative rotation with respect to the solid body.

21. The manufacturing device according to claim 12, wherein the axial distance separating said consolidation device from the point where the reinforcing tape comes into contact with the solid body is about equal to an average transverse dimension of the solid body.

22. A device for the manufacture of a composite article comprising a solid body composed of a plastic A, said device comprising:

at least one device adapted for winding at least one reinforcing tape around the solid body;

at least one consolidation device adapted to locally exert a pressure on the reinforcing tape, said consolidation device being arranged so as to exclusively exert the pressure at a location downstream of, and separated by an axial distance that is at least equal to a pitch of the wound reinforcing tape from a point where the reinforcing tape comes into contact with the solid body.

* * * * *